Figure 1:
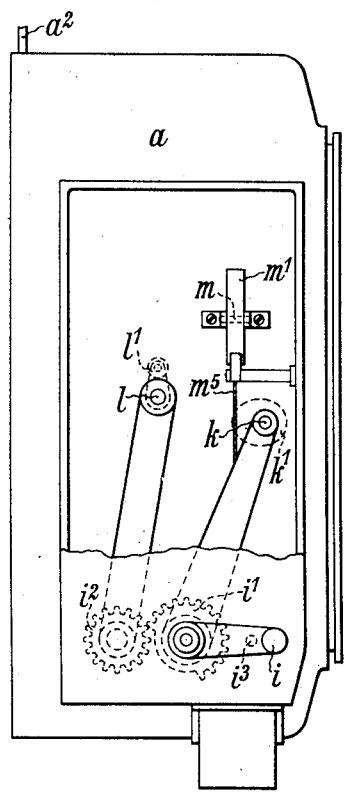

Jan. 30, 1923.

O. ROCKSTROH.
ROLL FILM DARK SLIDE.
FILED AUG. 8, 1921.

1,443,433.

2 SHEETS—SHEET 1.

Inventor:

Jan. 30, 1923.

O. ROCKSTROH.
ROLL FILM DARK SLIDE.
FILED AUG. 8, 1921.

1,443,433.

2 SHEETS—SHEET 2.

Inventor:

Patented Jan. 30, 1923.

1,443,433

UNITED STATES PATENT OFFICE.

OTTO ROCKSTROH, OF JENA, GERMANY, ASSIGNOR TO THE FIRM OF CARL ZEISS, OF JENA, GERMANY.

ROLL-FILM DARK SLIDE.

Application filed August 8, 1921. Serial No. 490,720.

*To all whom it may concern:*

Be it known that I, OTTO ROCKSTROH, a citizen of the German Empire, residing at Jena, Germany, have invented a new and useful Roll-Film Dark Slide, of which the following is a specification.

The present invention relates to roll film dark slides as employed in connection with photographic cameras. The films used therein are inclined to buckle, which causes the part of the film to be exposed, notwithstanding the tensioning of the film on being wound on the receiving spool, to frequently assume a curled form instead of the desired flat form, this curling becoming all the more evident, the greater the part of the film to be exposed. For avoiding this drawback roll film dark slides for larger sizes have therefore been provided with a device in which the part of the film to be exposed is pressed from the back against a plane-parallel glass plate by means of a plane plate. However, the insertion of such a glass plate into the path of the rays of light is accompanied by a number of drawbacks. For instance, the rays of light are partly reflected at the limiting surfaces of the plate, which not only involves a loss of light, but which may also give rise to interference fringes. Further disadvantages of the glass plate are for instance, that it is apt to become soiled, and that it may cause scratches on the sensitized film surface.

According to the invention the curling of the film may be avoided without introducing a glass plate into the path of the rays, and the drawbacks involved by this plate be therefore avoided, by providing the dark slides with a device by means of which the part of the film to be exposed may be sucked from the back onto a plane plate. For sucking out the air between the film and the plane plate the plate is suitably provided with a number of channels, which are in connection with an air-pump consisting, for instance, of a cylinder and, movable in it, a piston, or of extendible bellows. If a particularly good rarefaction of the air, lasting for as long a time as possible, is to be secured, the disposal of a frame corresponding in size to the images to be produced on the film is recommended, between which frame and the plane plate the film can be pressed, so that a closed up space is formed between the film and the plate. In order to obtain the desired rarefaction of the air at as slight a movement as possible of the member to be displaced for sucking the air out of the space between the film and the plane plate, hence, e. g., of the said piston, or of the hood to be guided loosely of the said bellows, the frame would, of course, have to be pressed against the film, before the suction commences (e. g., by means of cam discs or by a lever device). However, at the beginning of the suction wrinkles will frequently be formed in the film which would then have no chance of escaping from the space enclosed by the frame. In consideration of this fact a controlling device is suitably fitted, by means of which the pressing movement of the frame is made dependent on the movement of the member to be displaced for sucking the air out of the space between the film and the plane plate. The possibility is then given, by appropriately setting the controlling device, to have the frame pressed against the film but a certain time after the beginning of the suction, during which space of time any wrinkles which might be formed may escape from the space enclosed by the frame. It will furthermore serve for the removal of such wrinkles to so choose the contrivance for sucking the film onto the plane plate that from the beginning the film is more effectively sucked on in the middle of the plane plate than towards the margin, which may, e. g., be attained by connecting the channels in the plate with the air-pump in successive order, that is to say, those in the middle of the plate before those existing towards the margin, or, when all the channels in the plane plate are permanently in connection with the air-pump, by giving the channels in the middle of the plate a larger transverse section than those situated towards the margin. In order to be able to maintain a certain degree of rarefaction of the air between the film and the plane plate automatically, should air subsequently enter between the film and the plate, it will be found convenient to have springs disposed for the movement of the member to be displaced for sucking the air out, in which manner the said member is constantly kept under tension even after the suction, and it is automatically kept moving when air enters.

Figure 2:
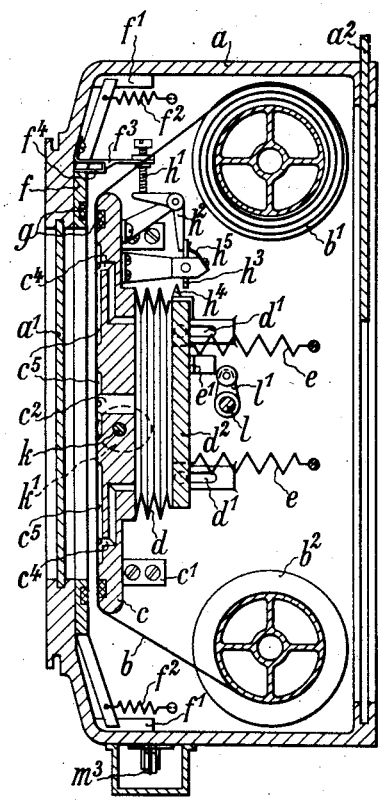
Figure 3:
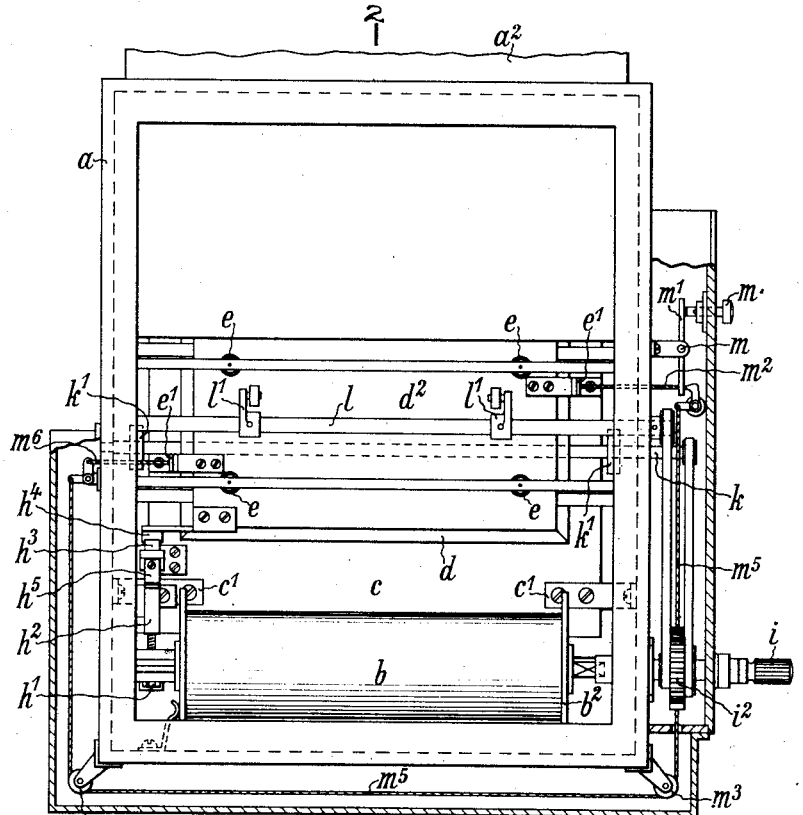
Figure 4:
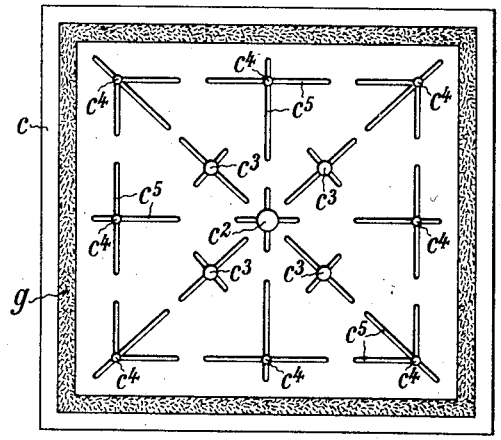

In the annexed drawing: Figs. 1 to 4 show a constructional example of a dark slide equipped according to the present invention, Fig. 1 being a side elevation of the dark slide, Fig. 2 a section through it along the line 2—2 of Fig. 3, Fig. 3 a back view of the dark slide, with the rear shutter partly withdrawn, and Fig. 4 a view of the plane plate onto which the film is to be sucked.

In the casing $a$ of the dark slide which may be closed by means of two shutters $a^1$ and $a^2$, the former of which faces the camera, two film spools, a supply spool $b^1$ and a receiving spool $b^2$, are removably fitted. Opposite the opening which may be closed by means of the shutter $a^1$ there is fixed to the casing by means of angle plates $c^1$ a plane plate $c$, which is provided with channels $c^2$, $c^3$, and $c^4$, and, at the surface turned towards the dark slide opening, with grooves $c^5$. The transverse sections of the channels are so chosen as to differ in size, the channels $c^4$ having the smallest and the channels $c^3$ a medium transverse section whilst the channel $c^2$ in the middle of the plate shows the largest transverse section. With the plate $c$ an extendible bellows $d$ is connected, which are closed by a back plate $d^2$ guided loosely in grooves $d^1$. Springs $e$, which are fastened, on the one hand, to the back plate and, on the other hand, to the casing of the dark slide, impart to the said back plate the tendency, to assume a position in which the bellows is extended. When the back plate $d^2$ has been brought into the opposite position, against the tension of the springs $e$, it is held in this position by means of spring operated pawls $e^1$. Between the plane plate $c$ and the dark slide wall to be turned towards the camera a frame $f$ is so disposed that it may be displaced perpendicularly to the plate $c$ between guide-bars $f^1$, which are fixed to the dark slide casing. Between the frame and the plane plate the film, marked $b$, is passed, so that it may be pressed against the plate by means of the frame. In order to have the connection between the film and the plate as air-tight as possible, the frame as well as the plate are padded with felt-strips $g$. Four springs $f^2$ (of which only two may be seen in the drawing), which are fixed to the dark slide casing, serve for pressing the frame $f$ onto the plate $c$, while two spring operated pawls $f^3$ serve for keeping the frame against the tension of the springs $f^2$ in a position in which its distance from the plate $c$ is such that the film may be freely passed between it and the plate. Furthermore, between the back plate $d^2$ and either of the two pawls $f^2$ a controlling device is disposed, each of which consists of a set-screw $h^1$, a cranked lever $h^2$, a two-armed lever $h^3$, and a projection $h^4$ fixed to the back plate $d^2$. Besides, to each of the pedestal bodies for the two-armed levers a plate-spring $h^5$ is fixed, which presses upon the one arm of the respective lever, and which is chosen so strong as to ensure the relative contact of the levers and of the cranked lever with the set-screw, however, which is not strong enought to disengage the pawl $f^3$. To one of the side-walls of the dark slide a crank $i$ is fitted, the shaft of which is coupled with the spool $b^2$ by means of a pair of toothed wheels $i^1$, $i^2$, and, in addition, is connected with a shaft $k$ by a belt-drive. The shaft of the toothed wheel $i^2$ is, likewise by a belt-drive, coupled with another shaft $l$. The ratio of the diameters of the pitch circles of the two toothed wheels is so chosen that the respective diameter of the wheel $i^1$ amounts to four units, when the corresponding diameter of the wheel $i^2$ is assumed to have three units. A quarter of the number of teeth of the wheel $i^1$ has, however, been cut away, so that, during one revolution of the crank $i$ the wheel $i^2$ also makes one revolution only, the arrangement being made in such a manner that, on the crank being rotated from the zero-position, which is made known by a notch $i^3$, during one quarter revolution the wheel $i^2$ takes no part in the rotation. Furthermore, the diameter of the driving wheel of the belt-drive actuating the shaft $k$ is as big again as the diameter of the driven wheel. The diameters of the wheels of the belt-drive for actuating the shaft $l$ are equal in size. To the shaft $k$ two non-circular discs $k^1$ are fixed which, on the shaft being rotated, serve for pushing the frame $f$ against the tension of the springs $f^2$ into that position in which it is held by the pawls $f^3$, whilst to the shaft $l$ two cranks $l^1$ are fixed, which, on being rotated, are to displace the back plate $d^2$ of the bellows against the tension of the springs $e$ until it becomes arrested by the pawls $e^1$. On that side of the dark slide to which the crank $i$ is fixed there is, moreover, a two-armed lever $m^1$ disposed, which is rotatable about an axis $m$, and one end of which is connected with one of the two pawls $e^1$ by means of a cord $m^2$ and with the other one of these pawls by means of a cord $m^5$ passing over the rollers $m^3$, $m^4$, and by means of a cord $m^6$, the other end being in contact with a knob $m^7$, so that the pressing down of this knob causes a movement of the spring operated pawls $e^1$ which is oppositely directed to their spring-tension.

One exposure being made, in order to bring a fresh portion of the film in the present dark slide into position for a further exposure, first of all the crank $i$ is turned round once, and thereupon the knob $m^7$ pressed down. By turning round the crank, in the first place, during the first quarter revolution the shaft $k$ is caused to make one half revolution. Thereby the frame $f$, which after the exposure was pressed against the film, is pushed by means of the curved discs $k^1$ into the drawn position, in which it is held by the pawls $f^3$, so that now the film may be freely passed between the plate $c$ and the frame $f$. During the remaining part of the revolution of the crank the toothed wheel $i^2$ is then caused to make one complete revolution, and the shaft $k$ a further one and a half revolution, the shaft $k$ running idle. The revolution of the toothed wheel $i^2$ causes in the first instance a revolution of the film spool $b^2$ and by this means a moving on of the film, and, besides, a complete revolution of the shaft $l$ and along with it of the cranks $l^1$, whereby the latter push the back plate $d^2$ of the bellows $d$, which was extended after the preceding exposure, into the drawn position, in which it is held by means of the pawls $e^1$. By pressing down the knob $m^7$ the spring-pawls $e^1$ are by means of the cords $m^2$ as well as $m^5$ and $m^6$ so far pulled back that the back plate $d^2$ of the bellows is released and follows the influence of the springs $e$. In this manner the air in the bellows and in the space between the film and the plate $c$, which space is connected with the bellows by means of the channels $c^2$, $c^3$, and $c^4$, becomes rarefied, and the film is therefore sucked onto the plate, the frame $f$ at first still being held in the drawn position by means of the pawls $f^2$. On the back plate $d^2$ then having covered part of its way, the projections $h^4$ strike against the levers $h^3$, by which means the pawls $f^3$ are moved against the tension of their springs, and thereby release the frame $f$, which may now follow the influence of the springs $f^2$, under which it is pressed against the film and the plate $c$, whereby an as air-tight as possible connection between the film and the plate is ensured. The back plate of the bellows moves under the influence of the springs $e$ until the air has been rarefied to a certain degree, without, however, coming into contact with a stop yet; it, therefore, remains still further under the influence of the springs, in which manner the maintenance of a certain degree of rarefaction of the air is continually aimed at.

I claim:

1. In a roll film dark slide, a plane plate, and a device for sucking the portion of the film to be exposed from the back onto the said plate, this device being fitted in the interior of the dark slide.

2. In a roll film dark slide, a plane plate, means for sucking the portion of the film to be exposed from the back onto the said plate, a frame corresponding to size of picture, and means for moving the said frame and the plane plate relatively to one another for pressing the film between the frame and the plate.

3. In a roll film dark slide, a plane plate, means comprising a member to be displaced for sucking the portion of the film to be exposed from the back onto the said plate, a frame corresponding to size of picture, means for moving the said frame and the plane plate relatively to one another for pressing the film between the frame and the plate, and a controlling device adapted to make the relative movement of the frame and the plate dependent on the movement of the said member.

4. In a roll film dark slide, a plane plate, means for sucking the portion of the film to be exposed from the back onto the said plate, and means for making this suction at the beginning more effective in the middle of the plate than towards the margin.

OTTO ROCKSTROH.

Witnesses:
PAUL KRUGER,
RICHARD HAHN.